United States Patent
Moen

(10) Patent No.: US 10,161,542 B1
(45) Date of Patent: Dec. 25, 2018

(54) MOUNTING HARD LINES TO A VEHICLE FRAME

(71) Applicant: CNH Industrial America LLC, New Holland, PA (US)

(72) Inventor: Richard A. Moen, Glenwood, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/809,070

(22) Filed: Nov. 10, 2017

(51) Int. Cl.
*F16L 3/22* (2006.01)
*F16L 3/223* (2006.01)
*F16L 3/10* (2006.01)
*A01B 76/00* (2006.01)

(52) U.S. Cl.
CPC ............ *F16L 3/223* (2013.01); *A01B 76/00* (2013.01); *F16L 3/1091* (2013.01)

(58) Field of Classification Search
CPC ......... A01B 76/00; F16L 3/1091; F16L 3/223
USPC ............... 248/68.1, 74.1, 74.2, 74.4, 231.61; 172/72 A
See application file for complete search history.

(56) References Cited

U.S. PATENT DOCUMENTS

| | | | |
|---|---|---|---|
| 947,441 A * | 1/1910 | Hankin | |
| 2,843,363 A * | 7/1958 | Mailander | F16L 3/2235 165/137 |
| 3,568,264 A | 3/1971 | Crist et al. | |
| 3,967,094 A * | 6/1976 | Petersen | H05B 3/32 174/138 J |
| 4,184,862 A * | 1/1980 | Waters | F28D 15/0275 165/162 |
| 4,243,193 A * | 1/1981 | Jones | B65G 19/18 248/301 |
| 4,660,790 A * | 4/1987 | Muz | F16L 3/2235 174/156 |
| 4,860,980 A * | 8/1989 | Michot | F16L 3/1075 24/504 |
| 4,881,674 A * | 11/1989 | Medianik | B60R 5/006 211/70.8 |
| 5,071,169 A | 12/1991 | Moschet | |
| 5,098,047 A | 3/1992 | Plumley | |
| 5,271,588 A | 12/1993 | Doyle | |
| 5,319,837 A | 6/1994 | Kujawski | |
| 5,564,576 A | 10/1996 | Masuda | |
| 7,530,536 B2 | 5/2009 | Hashimoto | |
| 8,950,538 B2 | 2/2015 | Kurauchi | |

(Continued)

FOREIGN PATENT DOCUMENTS

| | | |
|---|---|---|
| DE | 10023376 | 11/2001 |
| EP | 1914461 | 4/2008 |

*Primary Examiner* — Gwendolyn W Baxter
(74) *Attorney, Agent, or Firm* — Rebecca L. Henkel; Rickard K. DeMille

(57) ABSTRACT

An apparatus and method utilize a mounting arrangement having a base block and a mating retainer plate for securing a plurality of hard lines to a vehicle chassis in a spaced apart array. The base block includes several parallel slots having depressions for receiving pairs of hard lines and supporting them in a spaced relationship, prior to installation of the retainer plate. Once the hard lines are all positioned within the depressions in the slots of the base block, the retainer plate is secured to the base block in a face-to-face manner to the base block, to thereby secure the hard lines in the depressions of the slots in the spaced apart array of hard lines.

5 Claims, 3 Drawing Sheets

(56) References Cited

U.S. PATENT DOCUMENTS

| | | |
|---|---|---|
| 9,038,967 B2 | 5/2015 | Struck et al. |
| 9,334,622 B2 | 5/2016 | Puscheck |
| 2004/0135039 A1 | 7/2004 | Reichert et al. |
| 2008/0121764 A1 | 5/2008 | Komsitsky |
| 2014/0367529 A1 | 12/2014 | Choi |

* cited by examiner

MOUNTING HARD LINES TO A VEHICLE FRAME

FIELD OF THE INVENTION

This invention generally relates to mounting hard lines to a vehicle frame, and more particularly to mounting a plurality of hard lines to a vehicle chassis in a spaced apart array of hard lines, in a manner that is suitable for use in a self-propelled agricultural product applicator.

BACKGROUND OF THE INVENTION

Vehicles such as self-propelled agricultural product applicators typically have systems for distributing hydraulic fluid, fuel, brake fluid or pressurized air, air conditioning coolant, or other fluids through a series of rigid pipes, often referred to as hard lines. These hard lines are typically routed along a main frame that forms part of the chassis of the vehicle.

The hard lines are typically attached periodically along their lengths to the frame, to provide support for long sections of the line, and to secure the hard lines to the vehicle. In the past, such hard lines have generally been individually secured to the frame using commercially available hose and pipe clamps. The hard lines have often been bundled together with clamps or tie straps in a manner that is not aesthetically pleasing, and is conducive to the hard lines rubbing together and against the chassis, potentially leading to undesirable wear on the hard lines and the frame. Having the hard lines bundles together with one another makes them difficult to keep clean and prone to collecting dirt and corrosive chemicals, which can lead to undesirable corrosion of the hard lines.

Securing hard lines to the frame of a self-propelled agricultural applicator is particularly challenging, due to the unique configuration and operating environment of such machines. Such applicators are typically very large machines, carrying payloads weighing thousands of pounds of dry or liquid agricultural chemicals across uneven terrain at high speeds. The hard lines in such machines are long, and subject to high vibration loads. The operational environment is typically dusty, or muddy, and the chemicals applied tend to be corrosive. Such machines are often so called "high-boy" machines, having a chassis that is elevated several feet above the ground so that rows of partly grown crops can pass under the frame of the machine during operation, making it important that the hard lines be secured to the frame in locations where they will not become entangled with, or damage the crop passing below the frame. Also, because the frame of a high-boy-type applicator is several feet above the ground, the underside of the frame, and attached hard lines, are more readily visible than they would be in a typical over the road vehicle. As a result, it is more important to have the hard lines secured in a manner that is aesthetically pleasing and substantial.

It is desirable to provide an improved arrangement and method for mounting hard lines to a vehicle frame. It is desirable that such an improved arrangement be rugged enough to meet the demands of service in a self-propelled agricultural applicator. Such rugged demands should desirably include having the capability to secure multiple hard lines in an array of hard lines that is structurally sound and aesthetically pleasing. It is also desirable that an improved mounting arrangement be capable of securely mounting multiple hard lines in a spaced-apart array that precludes the lines from rubbing against one another or the frame, and also facilitates washing and cleaning of the hard lines to remove dust, mud, debris and chemical residue. It is further highly desirable that an improved mounting arrangement facilitate installation of the hard lines in the vehicle, by supporting them in the desired position prior to the desired spaced-apart arrays of hard lines being secured in position.

BRIEF SUMMARY OF THE INVENTION

The invention provides an apparatus and method utilizing a mounting arrangement having a base block and a mating retainer plate for securing a plurality of hard lines to a vehicle chassis in a spaced apart array of hard lines. The base block may include several parallel slots having depressions for receiving pairs of hard lines and supporting them in a spaced relationship, prior to installation of the retainer plate. Once the hard lines are all positioned within the depressions in the slots of the base block, the retainer plate is secured to the base block in a face-to-face manner, to thereby secure the hard lines in the depressions of the slots in the spaced apart array of hard lines.

In one form of the invention, a mounting arrangement for mounting hard lines to a vehicle frame includes a base block and a retainer plate. The base block may be adapted for fixed attachment to the frame of a vehicle, and have a body defining a mating face of the block, an edge of the block intersecting the mating face of the block, and a slot in the mating face extending completely through the block from an open end of the slot at the edge of the block to a closed end of the slot in the block. The retainer plate is adapted for operative attachment to the base block for retaining a hard line in the slot of the base block. The retainer plate may have a body of the plate defining a mating face of the plate that is wider than the slot in the base block, an edge of the plate intersecting the mating face of the plate, and a slot in the mating face extending completely through the body of the plate from an open end of the slot at the edge of the plate to a closed end of the slot in the plate. The base block and retainer plate are cooperatively configured and adapted for mounting the retainer plate to the base bock with the respective mating faces of the base block and retainer plate in face-to-face engagement with their respective slots aligned and the open ends of their respective slots oppositely oriented such that the engaged base block and retainer plate form a closed slot for retaining a hard line passing through the base block and retainer plate in the closed end slot formed by the face-to-face, cooperatively aligned engagement of the base block and retainer plate.

In some forms of the invention, the base block and retainer plate may include complimentary alignment features for aligning the slot in the retainer with the slot in the base block. Some forms of a mounting arrangement, according to the invention, may also include a mounting bracket adapted for mounting the base block to the vehicle frame.

The slot in the base plate may define a depression for receiving a hard line at a desired location within the slot in the base block, and the slot in the retainer plate may be cooperatively configured to hold the hard line in the depression.

In some forms of the invention, the slot, or slots in the base block and retainer plate are configured for retaining a hard line having a specific diameter, with the slots in the base block and retainer plate having widths of the slot substantially equal to the diameter of the hard line. A depression in the slot of the base block may have a depth, and the retainer plate being configured for offset alignment of the slot in the retainer plate from the slot in the base block by substantially the depth of the depression. By virtue of this arrangement, the side of the slot in the retainer plate opposite the depression will be spaced from the depth of the depression at the diameter of the hard line to thereby bear against the hard line and secure the hard line in the depression of the base block.

In some forms of the invention the slot, or slots in the base block and retainer may be configured for retaining two hard lines in a spaced apart, side-by-side relationship within a single slot. The slot in the base block may also define a pair of spaced depressions for receiving the two hard lines at first and second desired locations within the slot in the base block, and the slot in the retainer plate is configured to hold the two hard lines in the pair of depressions.

A base block and retainer plate may include two or more slots extending in a parallel relationship to one another, in some forms of the invention, for retaining two or more hard lines in separate slots. At least one of the two or more parallel slots in the base plate may include a pair of spaced depressions for receiving and retaining two hard lines at first and second desired locations within the slot in the base block, and the slot in the retainer plate may be configured to hold the two hard lines in the pair of depressions. The two parallel slots in the base plate may each define a pair of spaced depressions aligned with one another, from slot to slot, for receiving and retaining four hard lines aligned with one another at first and second desired locations within the slots in the base block. The slots in the retainer plate may be configured to hold the four hard lines in an aligned relationship within the aligned pairs of depressions.

The invention may also be practiced in the form of a vehicle frame having one or more mounting arrangements in accordance with the invention, for securing one or more hard lines to the frame. Where the vehicle includes multiple hard lines, the mounting arrangement(s) may be configured to secure the hard lines in a spaced apart array of hard lines.

The invention may further be practiced as a method for mounting a plurality of hard lines to a vehicle frame, by mounting the hard lines to the frame using a mounting arrangement in accordance with the invention. Where the mounting arrangement includes a mounting bracket adapted for mounting the base block to the vehicle frame, the method may include, attaching the base block of the mounting arrangement to the frame using the mounting bracket. A method, according to the invention, may also include inserting the hard lines into the slots in the base block through the open ends of the slots in the base block before attaching the retainer plate to the base block. A method, according to the invention may also include securing the retainer plate to the base block, after the hard lines have been inserted into the base block, to thereby secure the hard lines in the mounting arrangement and to the vehicle frame.

Other aspects, objectives and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain exemplary embodiments, there is no intent to limit it to those embodiments. On the contrary, the intent is to cover all alternatives, modifications and equivalents as included within the spirit and scope of the invention as defined by the appended claims.

DETAILED DESCRIPTION

Figure 1:
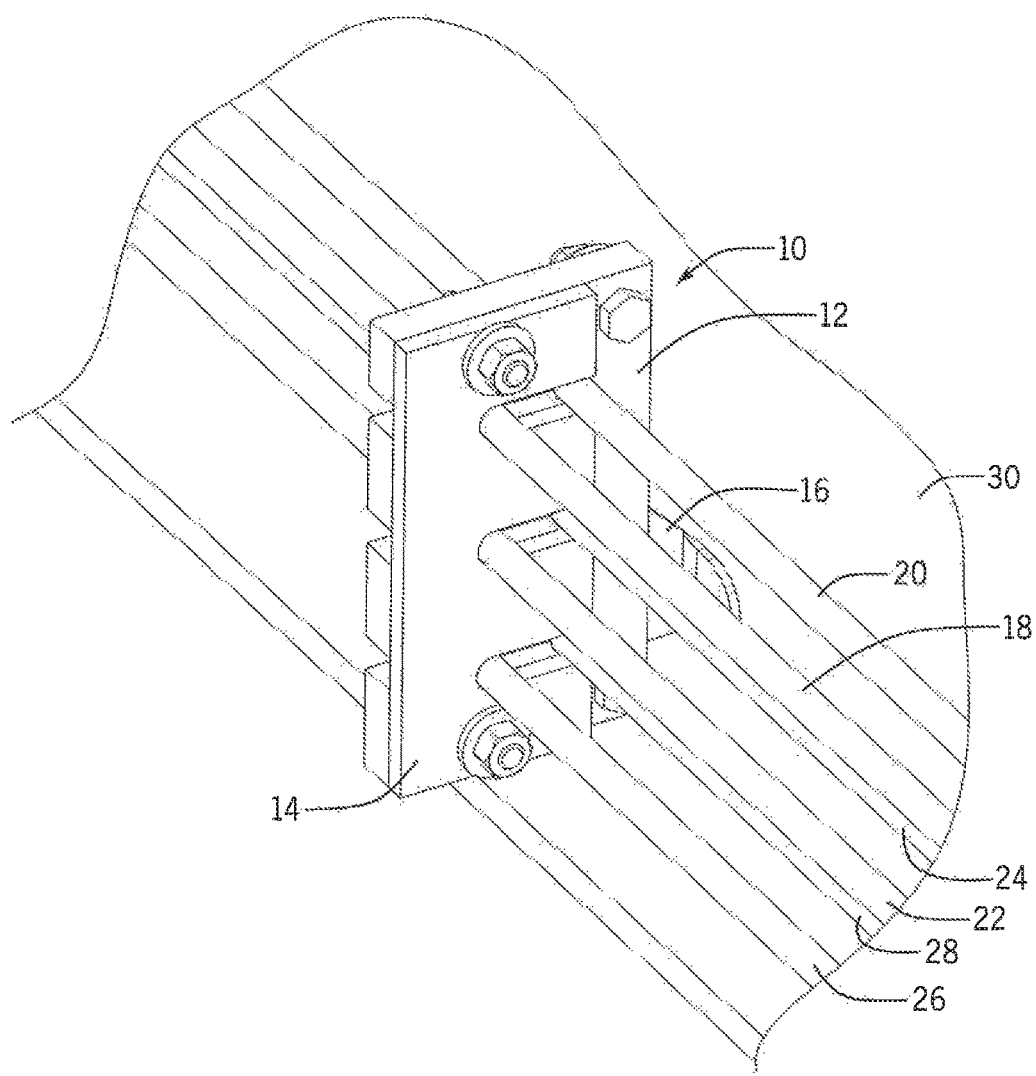
FIG. 1 is an isometric illustration showing an exemplary embodiment of the invention, in the form of a mounting arrangement having a base block and a mating retainer plate for securing a plurality of hard lines to a vehicle chassis in a spaced apart array of hard lines.

FIG. 1 shows an exemplary embodiment of a mounting arrangement 10, of the invention, having a base block 12, a mating retainer plate 14 and a mounting bracket 16 for securing a plurality of six hard lines 18, 20, 22, 24, 26, 28 to the frame 30 of a vehicle chassis in a spaced apart array of the hard lines 18, 20, 22, 24, 26, 28.

Figure 2:
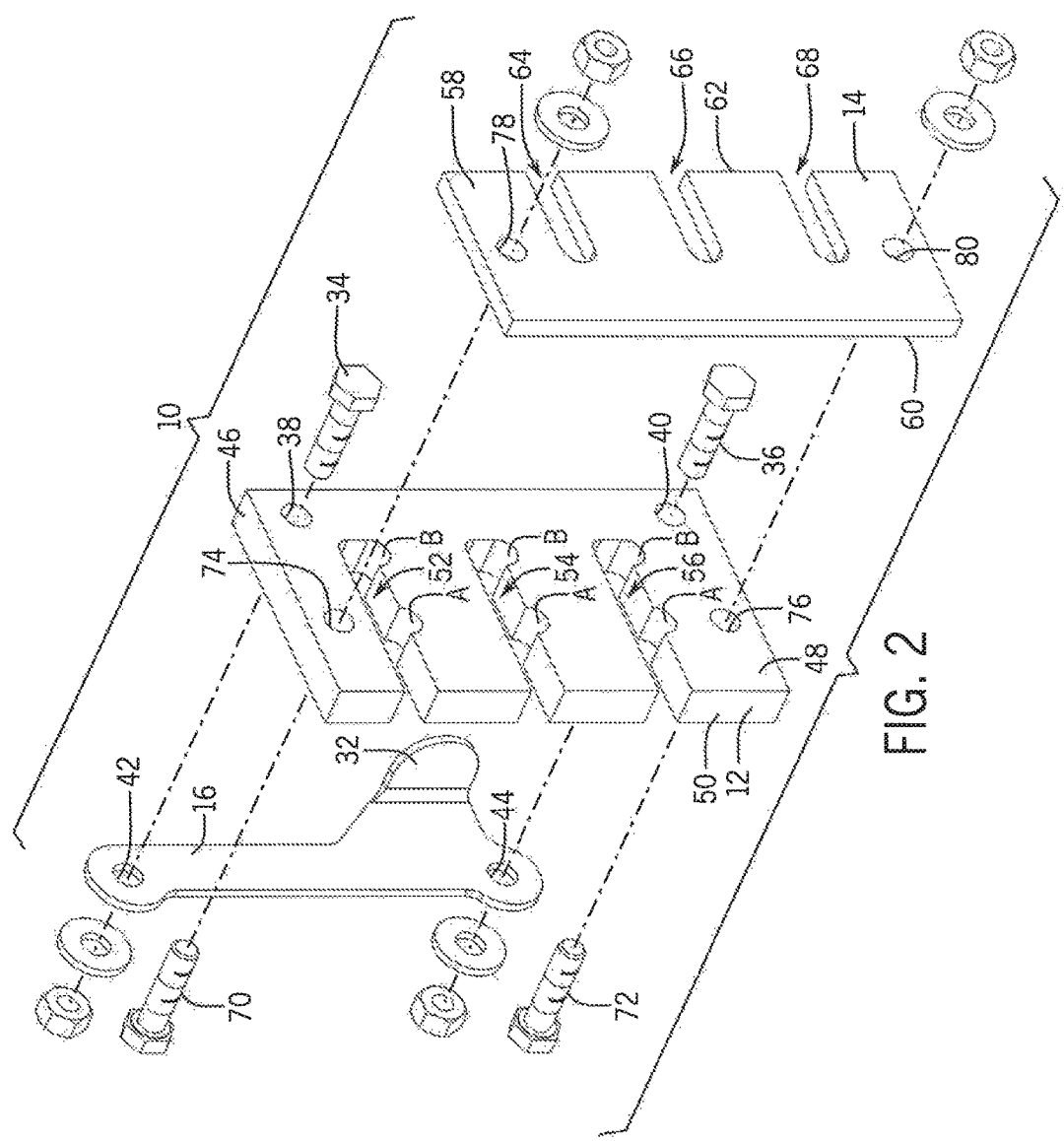
FIG. 2 is an exploded isometric illustration of the exemplary embodiment of the mounting arrangement shown in FIG. 1.

FIG. 2 is an exploded perspective illustration of components of the exemplary embodiment of the mounting arrangement 10 shown in FIG. 1, including the base plate 12, the mating retainer plate 14 and the mounting bracket 16.

As further illustrated in FIG. 2, the mounting bracket 16 has a mounting foot 32 that is adapted for welded attachment to the frame 30. In other embodiments of the invention, it will be understood that the mounting bracket may be bolted, or otherwise affixed to the frame 30. It will also be understood that the invention may be practiced in embodiments where the base block is attached directly to, or is integral with the frame 30.

The base block 12 is adapted for fixed attachment to the frame 30 of a vehicle, using a pair of base block mounting bolt arrangements 34, 36, passing sequentially through a pair of base block mounting holes 38, 40 in the base block 12, and a corresponding pair of mounting holes 42, 44 in the mounting bracket 16.

With continued reference to FIG. 2, the base block 12 has a body 46 that defines a mating face 48 of the block 12, an edge 50 of the block 12 intersecting the face 48 of the block 12, and a plurality of three parallel slots 52, 54, 56 in the face 48 of the block. The slots 52, 54, 56 extend completely through the block 12, and across the block 12 from an open end of the slots at the edge 50 of the block 12 to a closed end of the slots 52, 54, 56 within the body 46 of the block 12.

As further shown in FIG. 2, the retainer plate 14 is adapted for operative attachment to the base block 12, for retaining the six hard lines 18, 20, 22, 24, 26, 28 in the slots 52, 54, 56 of the base block 12. The retainer plate 14 a body 58 of the plate 14 defining a mating face 60 of the plate 14 that is wider than the area defined by the plurality of three slots 52, 54, 56 in the base block 12. The retainer plate 14 also defines an edge 62 of the plate 14 intersecting the face 60 of the plate 14, and a plurality of three slots 64, 66, 68 in the face 60, with each slot extending completely through the body 58 of the retainer plate 14, and across the body 60 from an open end of the slots 64, 66, 68 at the edge 62 of the plate 14 to a closed end of the slots 64, 66, 68 within the body 62 of the plate 14.

The base block 12 and retainer plate 14 are cooperatively configured and adapted for mounting the retainer plate 14 to the base bock 12 with the respective mating faces 48, 60 of the base block 12 and retainer plate 14 in face-to-face engagement with their respective pluralities of three slots 52, 54, 56; 64, 66, 68 aligned and the open ends of their respective pluralities of slots 52, 54, 56; 64, 66, 68 oppositely oriented, in the manner illustrated in FIGS. 1 and 2, such that the engaged base block 12 and retainer plate 14 form a plurality of three closed-ended slots for retaining the plurality of six hard lines 18, 20, 22, 24, 26, 28 in the closed-ended slots passing through the base block 12 and retainer plate 14.

The retainer plate 14 is secured to the base block 12, in the face-to-face relationship, by a pair of retainer plate mounting bolt arrangements 70, 72, passing sequentially through retainer plate mounting holes 74, 76; 78, 80 in the base block and retainer plate 14 respectively. In the exemplary embodiment, the retainer plate mounting holes 74, 76; 78, 80 in the base block and retainer plate 14 serve as complimentary alignment features for aligning the slots 64, 66, 68 in the retainer plate 14 with the slots 52, 54, 56 in the base block 12, when the retainer plate mounting bolt arrangements 70, 72 are inserted through the retainer plate mounting holes 74, 76; 78, 80 in the base block and retainer plate 14.

As shown in FIG. 2, each of the three slots 52, 54, 56 in the base block 12 defines a pair of spaced apart first and second depressions A,B for receiving two specific hard lines of the plurality of hard lines 18, 20, 22, 24, 26, 28 at first and second desired locations defined by the first and second depressions A,B within each of the slots 52, 54, 56 in the base block 12. As described in more detail below, the slots 64, 66, 68 in the retainer plate 14 are configured to hold the two hard lines in each slot 52, 54, 56 in the pair of depressions A,B of each slot 52, 54, 56 in the base block 12.

Figure 3:
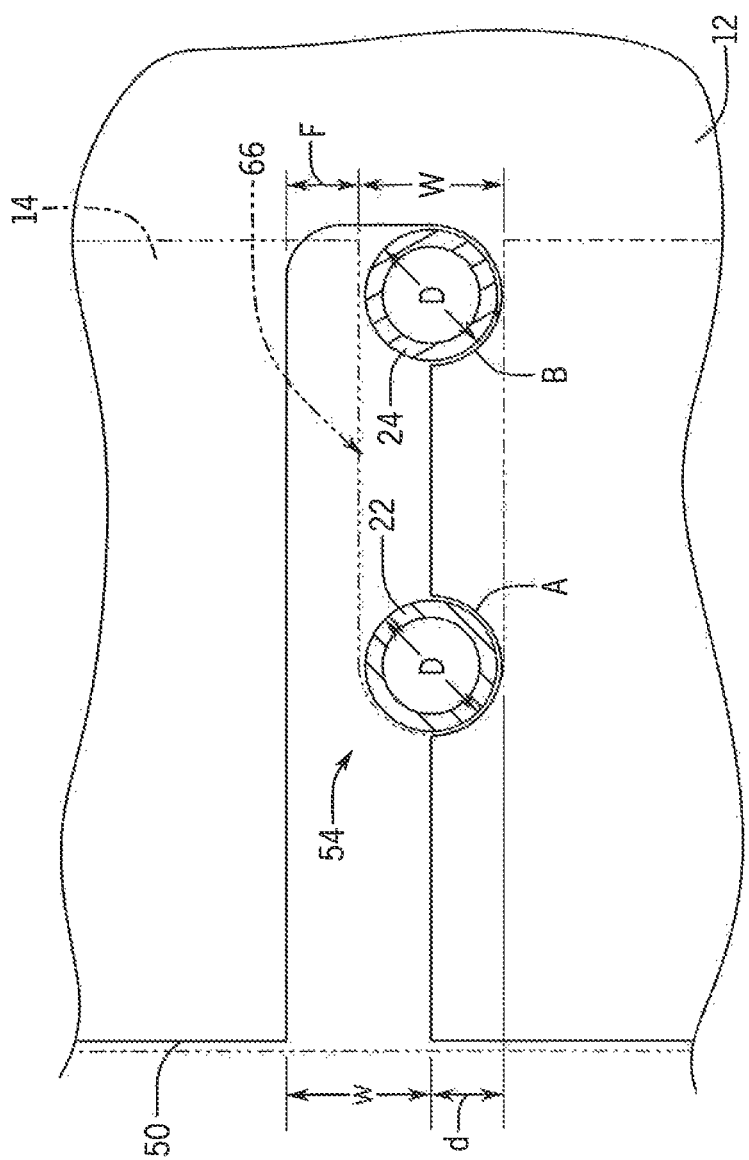
FIG. 3 an orthographic illustration of a portion of the base block and retainer plate of the exemplary embodiment of the mounting arrangement shown in FIGS. 1 and 2, with the retainer plate shown in phantom lines and the base plate shown in solid lines, to illustrate the manner in which the retainer plate of the exemplary embodiment provides slots aligned in an offset manner for securing a pair of hard lines in depressions in the side wall of a slot in the base plate.

FIG. 3 an orthographic illustration of an area around the middle slots 54, 66 of the base block 12 and retainer plate 14 of the exemplary embodiment of the mounting arrangement 10 shown in FIGS. 1 and 2. In FIG. 3, the retainer plate 14 is shown in phantom lines and overlaying the base block 12, with the base block 12 shown in solid lines, to illustrate the manner in which the slots 64, 66, 68 of the retainer plate 14 are aligned in an offset manner with respect to the slots 52, 54, 56 in the base block 12, for securing the hard lines 18, 20, 22, 24, 26, 28 in depressions A,B in the side walls of a slots 52, 54, 56 of the base block 12.

As shown in FIG. 3, with specific reference to the two hard lines 22, 24 disposed respectively in the first and second depressions A,B of the middle slot 54 of the base block, the hard lines 22, 24 each have the same outside diameter 'D'. The middle slots 54, 66 in the base block 12 and retainer plate 14 also have identical widths 'W' that are substantially equal to the diameter D of the hard line, with just enough clearance to allow the hard lines 22, 24 to slide into the middle slot 55 in the base block 12, and for the middle slot 66 in the retainer plate 14 to slide into place over the hard lines 22, 24 in the middle slot 54 of the base block 12. The first and second depressions A,B in the middle slot 54 of the base block have a depth 'd' beyond the wall of the middle slot 54 in the base block 12. By virtue of this configuration, the hard lines 20, 24 can be slid into the middle slot 54 of the base block 12 until they drop into place in their respective one of the first or second depressions A,B in the base block 12.

The slots 64, 66, 68 in the retainer plate 14 are positioned with respect to one another and the retainer plate mounting bolt holes 78 80 in the retainer plate 14 in such a manner that the slots 64, 66, 68 in the retainer plate 14 are offset from the slots 52, 54, 56 in the base block 12 in the same direction as the first and second depressions A,B in the slots 64, 66, 68 in the base block 12 by a distance 'F' that is substantially equal to the depth d of the depressions A,B.

As shown in FIG. 3, with specific reference to the hard lines 22, 24 in the middle slots 54, 66, because the width W of the middle slot 66 in the retainer plate 12 is substantially equal to the outside diameter D of the hard lines 22, 24, and because the offset F of the middle slot 66 in the retainer plate 14 from the middle slot 52 in the base block 12 is substantially equal to the depth d of the depressions A,B, the wall of the middle slot 66 in the retainer plate 14 bears against the outer surface of the hard lines 22, 24 at points opposite the depressions A,B in a manner that holds the hard lines 22, 24 in their respective first and second depressions A,B in the middle slot 54 of the base block 12, when the retainer plate 14 is secured to the base block 12. The mounting arrangement 10 thus holds the hard lines 22, 24 in the middle slots 54, 66 in a fixed, spaced relationship from one another.

As shown in FIGS. 1 and 2, in the exemplary embodiment of the mounting arrangement 10, the first and second depressions A,B in the three parallel slots 52, 54, 56 are all aligned with one another in a first and a second column, such that the hard lines 18, 20, 22, 24, 26, 28 are positioned in a two-by-three spaced apart array when the hard lines 18, 20, 22, 24, 26, 28 are secured by the mounting arrangement 10. Those having skill in the art will appreciate that in other embodiments of the invention, a mounting arrangement according to the invention may secure more, or fewer than six hard lines, and may secure the hard lines in a differently shaped and spaced array. It will also be appreciated that, although the hard lines in the exemplary embodiment described herein are all of the same outside diameter, the invention may be practiced with hard lines of differing diameters secured in the same mounting arrangement by modifying the specific teachings of the exemplary embodiments described herein, within the scope of the invention, to secure a plurality of hard lines of different diameters in a spaced-apart array to a vehicle frame using a mounting arrangement in accordance with the invention.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mounting arrangement for mounting hard lines to a vehicle frame, the mounting arrangement comprising:

a base block adapted for fixed attachment to the frame of a vehicle and having a body defining a mating face of the block, an edge of the block intersecting the mating face of the block, and a plurality of parallel slots in the mating face extending completely through the body of the base block from an open end of the slots at the edge of the block to a closed end of the slots in the block; and a retainer plate adapted for operative attachment to the base block for retaining a plurality of hard lines in the slots of the base block;

the retainer plate having a body of the plate defining a mating face of the plate that is wider than the plurality of slots in the base block, an edge of the plate intersecting the mating face of the plate, and a plurality of slots in the face extending completely through the body of the plate from an open end of the slots at the edge of the plate to a closed end of the slots in the plate;

the base block and retainer plate being cooperatively configured and adapted for mounting the retainer plate to the base bock with the respective mating faces of the base block and retainer plate in face-to-face engagement with their respective pluralities of slots aligned and the open ends of their respective pluralities of slots oppositely oriented such that the engaged base block and retainer plate form a plurality of closed slot for retaining a plurality of hard lines therein passing through the base block and retainer plate;

wherein at least one of the slots of the plurality of slots in the base block defines a pair of spaced depressions for receiving two of the plurality of hard lines at first and second desired locations within the slot in the base block, and the slot in the retainer olate is configured to hold the two hard lines in the pair of depressions.

2. The mounting arrangement of claim 1, wherein the at least one slot in the base block and a corresponding slot in the retainer plate are configured for retaining a hard line having a diameter, with the one slot and corresponding slot in the base block and retainer plate having widths of the one slot and corresponding slot that are substantially equal to the diameter of the hard line, the depressions having a depth, and the retainer plate being configured for offset alignment of the corresponding slot in the retainer plate from the at least one slot in the base block by substantially the depth of the depression.

3. The mounting arrangement of claim 2, wherein at least two of the parallel slots in the base plate each define a pair of spaced depressions aligned with one another for receiving and retaining four hard lines aligned with one another at first and second desired locations within the slot in the base block, and the slot in the retainer plate is configured to hold the four hard lines in an aligned relationship within the pairs of depressions.

4. The mounting arrangement of claim 3, wherein the base block and retainer plate include complimentary alignment features for aligning the slots in the retainer with the slots in the base block.

5. The mounting arrangement of claim 4, further comprising a mounting bracket adapted for mounting the base block to the vehicle frame.

* * * * *